United States Patent [19]

Klemer et al.

[11] Patent Number: 5,450,429
[45] Date of Patent: Sep. 12, 1995

[54] EFFICIENT LINEAR FREQUENCY DOUBLED SOLID-STATE LASER

[75] Inventors: Daniel R. Klemer, Dayton; Mark D. Sobottke, Kettering, both of Ohio

[73] Assignee: Spectra-Physics Laserplane, Inc., Dayton, Ohio

[21] Appl. No.: 252,948

[22] Filed: Jun. 2, 1994

[51] Int. Cl.$^6$ .............................................. H01S 3/10
[52] U.S. Cl. ...................................... 372/22; 372/98; 372/21; 372/39; 372/99
[58] Field of Search ................... 372/21, 22, 108, 107, 372/39, 41, 99, 98

[56] References Cited

U.S. PATENT DOCUMENTS

| | | |
|---|---|---|
| 3,949,323 | 4/1976 | Bierlein et al. |
| 3,982,201 | 9/1976 | Rosenkrantz et al. |
| 4,035,742 | 7/1977 | Schiffner |
| 4,272,733 | 6/1981 | Walling et al. |
| 4,383,318 | 5/1983 | Barry et al. |
| 4,387,297 | 6/1983 | Swartz et al. |
| 4,413,342 | 11/1983 | Cohen et al. |
| 4,553,238 | 11/1985 | Shaw et al. |
| 4,617,666 | 10/1986 | Liu |
| 4,618,957 | 10/1986 | Liu |
| 4,637,026 | 1/1987 | Liu |
| 4,653,056 | 3/1987 | Baer et al. |
| 4,656,635 | 4/1987 | Baer et al. |
| 4,665,529 | 5/1987 | Baer et al. |
| 4,701,929 | 10/1987 | Baer et al. |
| 4,723,257 | 2/1988 | Baer et al. |
| 4,730,335 | 3/1988 | Clark et al. |
| 4,731,787 | 3/1988 | Fan et al. |
| 4,731,795 | 3/1988 | Clark et al. |
| 4,739,507 | 4/1988 | Byer et al. |
| 4,756,003 | 7/1988 | Baer et al. |
| 4,761,786 | 8/1988 | Baer |
| 4,884,281 | 11/1989 | Hawthorn et al. |
| 5,128,798 | 7/1992 | Bowen et al. |
| 5,164,947 | 11/1992 | Lukas et al. |

OTHER PUBLICATIONS

Culshaw et al, "Efficient Frequency-Doubled Single-Frequency Nd: YAG Laser", IEEE Journal of Quantum Electronics, vol. QE-10, No. 2, Feb. 1974, pp. 253-263.

Smith, Richard G., "Theory of Intracavity Optical Second-Harmonic Generation", IEEE Journal of Quantum Electronics, Vo. Qe-6, No. 4, Apr. 1970, pp. 215-223.

Yarborough et al, "Enhancement of Optical Second Harmonic Generation by Utilizing the Dispersion of Air", Applied Physics Letters, vol. 18, No. 3, Feb. 1, 1971, pp. 70-73.

Oka et al, "Stable intracavity doubling of orthogonal lineraly polarized modes in diode-pumped ND: YAG lasers", Optics Letters, vol. 13, No. 10, Oct. 1988, pp. 805-807.

James et al, "Intermittency and chaos in intracavity doubled lasers", Physical Review A, vol. 41, No. 5, Mar. 1, 1990, pp. 2778-2790.

(List continued on next page.)

Primary Examiner—Leon Scott, Jr.
Attorney, Agent, or Firm—Killworth, Gottman, Hagan & Schaeff

[57] ABSTRACT

A solid-state laser comprises a pump diode for generating pump radiation and transmitting the pump radiation into a laser cavity. The pump radiation passes through an entrance mirror and enters a laser gain chip which lases to produce fundamental laser light. The fundamental laser light passes through a harmonic reflector and a first dispersive element and is frequency doubled by a frequency doubler chip to produce harmonic laser light. The harmonic laser light passes through a second dispersive element and impinges on a mirrored surface. A portion of the harmonic laser light passes through the mirrored surface to form the output beam of the laser. The remaining portion of the harmonic laser light is reflected back into the laser cavity. First and second dispersive elements control the phase of the harmonic laser light in the laser cavity such that substantially all of the harmonic laser light is in-phase when the harmonic laser light impinges upon the mirrored surface.

25 Claims, 3 Drawing Sheets

OTHER PUBLICATIONS

Chinn et al, "Low-Threshold, Transversely Excited NdP5014 Laser", *IEEE Journal of Quantum Electronics,* Sep. 1975, pp. 747–754.

Budin et al, "On the Design of Neodymium Miniature Lasers", *IEEE Journal of Quantum Electronics,* vol. QE-14, No. 11, Nov. 1978, pp. 831–839.

Budin et al, "Miniature Nd-pentaphosphate laser with bonded mirrors side pumped with low-current density LED's", *Appl. Phys. Lett.* 33(4), Aug. 15, 1978, pp. 309–310.

Kubodera et al, "Stable LiNdP4012 miniature laser", *Applied Optics,* vol. 18, No. 6, Mar. 15, 1979, pp. 884–890.

Weber et al, "Nd-ultraphosphate laser", *Appl. Phys. Letters,* vol. 22, No. 15, May 15, 1973, pp. 534–536.

Owyoung et al, "Gain switching of a monolithic single-frequency laser-diode-excited Nd: YAG Laser", *Optics Letters,* vol. 10, No. 10, Oct. 1985, pp. 484–486.

Kubodera et al, "Spike-Mode Oscillations in Laser-Diode Pumped LiNdP4012 Lasers", *IEEE Journal of Quantum Electronis,* vol. QE-17, No. 6, Jun. 1981, pp. 1139–1144.

Chinn, S. R., "Intracavity second-harmonic generation in a Nd pentaphosphate laser", *Appl. Phys. Lett.,* vol. 29, No. 3, Aug. 1, 1976, pp. 176–179.

Chesler et al, "Miniature diode-pumped Nd: YlAG lasers", *Appl. Phys. Lett.,* vol. 23, No. 5, Sep. 1, 1973, pp. 236–236.

Barnes, "Diode-pumped solid-state lasers", *J. Appl. Phys.,* vol. 44, No. 1, Jan. 1, 1973, pp. 230–237.

Ostermayer, Jr., "GaAs1-zPz Diode Pumped YAG:Nd lasers", *Appl. Phys. Lett.,* vol. 18, No. 3, Feb. 1, 1971, pp. 93–96.

Allen et al, "Continuous Operation of a YAlG:Nd Laser by Injection Luminescent Pumping", *Appl. Phys. Lett.,* vol. 14, No. 6, Mar. 15, 1969, pp. 188–190.

Schmitt et al, "Diode-laser-pumped Nd:YAG laser injection seeding system", *Applied Optics,* vol. 25, No. 5, Mar. 1, 1986, pp. 629–633.

Baer, T., "Diode Laser Pumping of Solid-State Lasers", Reprint from *Laser Focus,* Jun. 1986.

Farmer et al, "Solid State Pumping Source for Nd:YAG Lasers with Integrated Focusing Optics", IBM Technical Disclosure Bulletin, vol. 15, No. 1, Jun. 1972, pp. 149–150.

Semiconductor Laser Specification Sheet, Toshiba Corporation, Feb. 9, 1987, 5 pages.

Data Sheet MOM-MM-163, "Cargille Meltmounts for Microscopy", Cargille Laboratories, Inc., Jan. 1, 1987, 2 pages.

Announcement Sheet, "CFE4 Spectroscopic properties and lasing of ND:GdV04 pumped by a diode laser and a Ti:sapphire", Announced Feb. 1993.

Sorokin et al, "CW pasive mode-locking of a new ND3+:GdVO4 laser", ATuC2-1, Feb. 1993, pp. 203–205.

Ostroumov et al, "Nd:GdVO4 Crystal-a New Material for Diode-Pumped Solid-State Lasers", AMC1-1, Feb. 1993, pp. 52–54.

EFFICIENT LINEAR FREQUENCY DOUBLED SOLID-STATE LASER

BACKGROUND OF THE INVENTION

The present invention relates generally to solid-state lasers and, more particularly, to linear frequency-doubled solid-state lasers wherein second harmonic laser light propagates in opposing directions in at least a portion of the laser cavity. Dispersive elements positioned within the laser cavity align the phases of the oppositely-propagating second harmonic laser light beams such that the second harmonic laser light beams are interferometrically added, thereby increasing the output power and efficiency of the laser.

A typical intracavity, frequency-doubled solid-state laser includes a laser medium which lases to produce light at a fundamental wavelength in response to pump radiation generated by a pump source, such as a laser diode. The fundamental laser light, which is usually in the infrared range of the optical spectrum, enters a frequency doubler medium which doubles the frequency to produce second harmonic laser light. Typically, the second harmonic laser light has a wavelength in the visible portion of the optical spectrum. A portion of the second harmonic laser light emanates from the frequency doubler medium and exits through the front end of the laser cavity.

The remaining portion of the second harmonic laser light emanates from the frequency doubler medium in a direction toward the back end of the laser cavity. To increase the efficiency and output power of the laser, it would be advantageous to redirect the backwards-propagating second harmonic laser light toward the front end of the laser cavity. Unfortunately, the redirected second harmonic laser light may destructively interfere with the forward-propagating second harmonic laser light and, consequently, reduce the output power and efficiency of the laser.

In the past, laser designers have avoided this problem by various methods. One method is to permit the backwards-propagating second harmonic laser light to pass out of the back end of the laser cavity. Consequently, the likelihood of destructive interference occurring is practically nonexistent. However, the power contained in the backwards-propagating second harmonic laser light does not contribute to the laser output and, therefore, the laser is relatively inefficient.

Laser designers have also attempted to control the phase of the second harmonic laser light to reduce the possibility of destructive interference in the laser cavity. For example, due to the dispersion of air, the distance between the internal redirection mirror surface and the frequency doubler medium can be carefully varied to control phase. However, as is fully discussed in an article by R. Smith entitled "Theory of Intracavity Optical Second-Harmonic Generation" published in the IEEE Journal of Quantum Electronics, Vol. QE-6, NO. 4, April 1970, at pages 215–223, such a method is impracticable since control of the distance would be required to within a small fraction of a wavelength. Smith also suggests applying an electric field to the frequency doubler crystal or interposing an electrooptic element between the frequency doubler crystal and the output mirror.

Another common method for reducing the potential for destructive interference within the laser cavity consists of changing the polarization of the backwards-propagating second harmonic laser light. An example of such a laser is disclosed in U.S. Pat. No. 5,164,947 issued to Lukas et al. This laser employs a Brewster plate in conjunction with birefringent waveplates positioned between the laser medium and the frequency doubling medium for changing the polarization of the backwards-propagating second harmonic laser light such that the light can be redirected along a path coincident to the forward-propagating harmonic laser light without interference.

Lukas et al. also disclose a laser which utilizes an L-shaped laser cavity wherein the fundamental harmonic laser light is reflected at an angle by a polarizing reflector into the frequency doubler medium. The polarizing reflector is highly reflective at the fundamental wavelength and is highly transmissive at the second harmonic wavelength. After reflection from the polarizing reflector, the fundamental harmonic laser light enters the frequency doubler medium and is converted into second harmonic laser light. A portion of the second harmonic laser light is emitted from the frequency doubler medium through the polarizing reflector to form a portion of the output laser.

The portion of the second harmonic laser light transmitted away from the polarizing reflector is reflected by a dual band mirror through the frequency doubler medium and the polarizing reflector. The phase difference between the second harmonic light emitted toward the polarizing reflector and the second harmonic light reflected from the dual band mirror is determined by the design of the dual band mirror and the distance between the dual band mirror and the frequency doubler medium. To reduce the effect of deviations in this distance, the reflective coating, which is phase-preserving, of the dual band mirror is applied directly to the end of the frequency doubler medium.

Additionally, it has been found that the level of nonlinear coupling between the fundamental and second harmonic laser light within the doubling crystal is dependent upon the amount of second harmonic laser light resonating in the laser cavity. Theoretically, the efficiency of the laser can thus be increased by resonating a greater portion of the second harmonic laser light in the laser cavity. Higher levels of second harmonic laser light in the laser cavity, however, greatly increase the potential for destructive interference and the resulting loss in power and efficiency. Consequently, laser designers have heretofore attempted to limit the amount of second harmonic laser light resonating in the laser cavity.

Accordingly, a need exists in the art for a linear, frequency-doubled solid-state laser wherein the phases of the oppositely-propagating second harmonic laser lights resonating in the laser cavity are controlled such that the second harmonic laser lights constructively interfere to provide increased power and higher efficiency.

SUMMARY OF THE INVENTION

This need is met by a solid-state laser in accordance with the invention wherein dispersive elements are disposed in a laser cavity to control the phase of second harmonic light within the cavity. The dispersive elements control the phase of the harmonic laser light such that substantially all of the harmonic laser light beams interfere constructively at a front end of the laser cavity, thereby increasing the output power and efficiency of the laser.

In accordance with one aspect of the present invention, a linear solid-state laser comprises a laser cavity assembly for defining a laser cavity and including a mirrored surface forming a front end of the laser cavity. A laser pump device generates pump radiation which enters the laser cavity. A laser gain chip, which may be lithium neodymium tetraphosphate (LNP), is positioned in the laser cavity and generates fundamental laser light in response to the pump radiation. The laser gain chip may also be a neodymium-doped or neodymium stoichiometric material. A frequency multiplier chip multiplies the frequency of the fundamental laser light to produce harmonic laser light. A harmonic reflector interposed between the laser gain chip and the frequency multiplier chip reflects the harmonic laser light into the frequency multiplier chip.

A first phase compensator interposed between the harmonic reflector and the frequency multiplier chip controls the phase of the harmonic laser light which passes therethrough. Similarly, a second phase compensator interposed between the frequency multiplier chip and the front end of the laser cavity controls the phase of the harmonic laser light which passes therethrough. The first and second compensators shift the phase of the harmonic laser light such that substantially all of the harmonic laser light is in-phase when the harmonic laser light arrives at the front end of the laser cavity.

Preferably, the mirrored surface forming the front end of the laser cavity is highly reflective of the fundamental laser light, partially reflective of the harmonic laser light and partially transmissive of the harmonic laser light. The frequency multiplier chip may be a frequency doubler chip formed of potassium titanyl phosphate for doubling the frequency of the fundamental laser light to produce the harmonic laser light.

The first and second phase compensators may comprise first and second dispersive elements formed from glass. Preferably, first and second dispersive elements have wedge shapes such that displacement of the elements varies the phase shift of the harmonic laser light which passes therethrough.

The harmonic reflector may comprise a reflective coating applied to the first dispersive element for reflecting the harmonic laser light. The reflective coating may be positioned immediately adjacent the laser gain chip.

In accordance with another aspect of the present invention, a linear solid-state laser comprises an entrance mirror forming a back end of a laser cavity and output coupler including a mirrored surface forming a front end of the laser cavity. A laser pump device generates pump radiation and transmits the pump radiation into the laser cavity. A laser gain chip positioned in the laser cavity generates fundamental laser light in response to the pump radiation. The laser gain chip is generally partially transmissive to second harmonic laser light produced from the fundamental laser light.

A frequency doubler chip doubles the frequency of the fundamental laser light to produce the second harmonic laser light. A first phase compensator interposed between the laser gain chip and the entrance mirror controls the phase of the second harmonic laser light which passes therethrough and a second phase compensator interposed between the frequency doubler chip and the mirrored surface of the output coupler controls the phase of the second harmonic laser light which passes through the second phase compensator. The first and second phase compensators shift the phase of the second harmonic laser light such that substantially all of the second harmonic laser light is in-phase when the second harmonic laser light arrives at the mirrored surface of the output coupler.

In accordance with yet another aspect of the present invention, a linear solid-state laser for generating harmonic laser light comprises a laser cavity assembly defines a laser cavity and includes an output coupler forming a front end of the laser cavity. The output coupler has a mirrored surface which is highly transmissive to the harmonic laser light. A laser pump device generates pump radiation and transmits the pump radiation into the laser cavity. A laser gain chip positioned in the laser cavity generates fundamental laser light in response to the pump radiation. The frequency of the fundamental laser light is multiplied by a frequency multiplier chip to produce the harmonic laser light.

A harmonic reflector is interposed between the laser gain chip and the frequency multiplier chip for reflecting the harmonic laser light into the frequency multiplier chip. A phase compensator is interposed between the harmonic reflector and the frequency multiplier chip for controlling the phase of the harmonic laser light which passes through the phase compensator such that substantially all of the harmonic laser light is in-phase when the harmonic laser light arrives at the mirrored surface of the output coupler. Preferably, the phase compensator is a dispersive element comprised of glass.

It is thus a feature of the present invention to provide a solid-state laser having dispersive elements positioned within a laser cavity to control the phase of harmonic laser light.

These and other features and advantages of the present invention will become apparent from the following detailed description, the accompanying drawings and the appended claims.

DETAILED DESCRIPTION OF THE INVENTION

Figure 1:
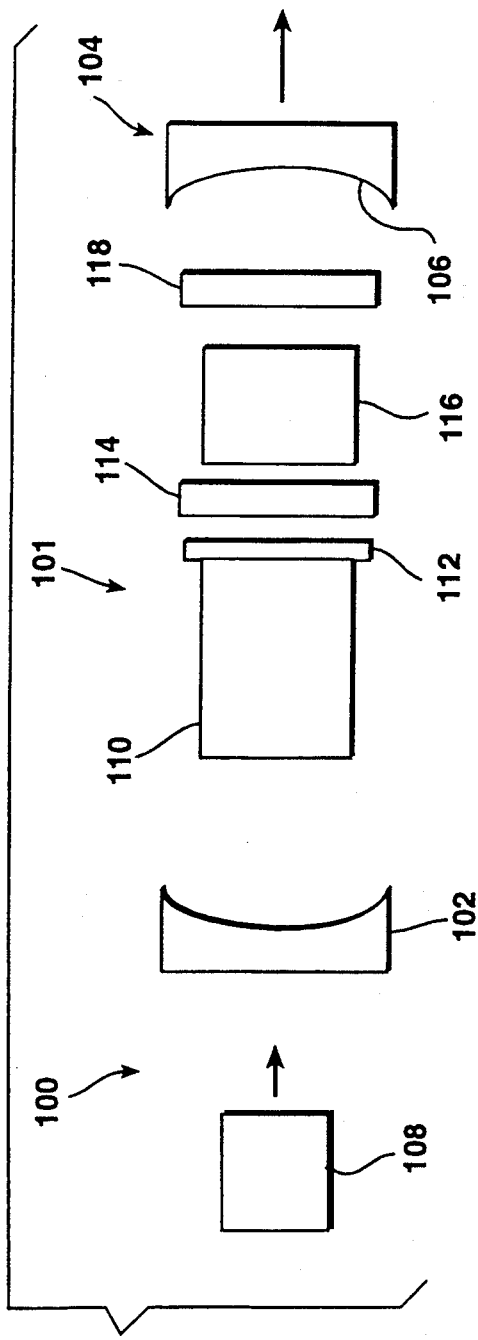
FIG. 1 is a bench construction of a solid-state laser having first and second dispersive elements in accordance with one embodiment of the present invention.

A bench construction of a frequency-doubled solid-state laser 100 in accordance with one embodiment of the present invention is shown in FIG. 1. A laser cavity assembly defines a laser cavity 101 and comprises an entrance mirror 102 forming a back end of the laser cavity 101 and output coupler 104 including a mirrored surface 106 forming a front end of the laser cavity 101. A laser pump device, shown as laser diode 108, generates pump radiation which passes through the entrance mirror 102 and enters the laser cavity 101. Typically, the pump radiation has a wavelength of around 800 nm.

A laser gain chip 110 is positioned in the laser cavity 101 to receive the pump radiation which transverses the entrance mirror 102. The laser gain chip 110 lases in response to the pump radiation to generate fundamental laser light. A preferred laser gain chip 110 is comprised of lithium neodymium tetraphosphate (LNP). Further, the laser gain chip may be comprised of a neodymium-doped or a neodymium stoichiometric material.

The laser gain chip 110 transmits the fundamental laser light in both the forward and backward directions in the laser cavity 101. Hereinafter, forward-propagating laser light will be used to designate laser light travelling toward the front end of the laser cavity 101 (i.e., mirrored surface 106) and backward-propagating laser light will designate laser light travelling toward the back end of the laser cavity 101 (i.e., entrance mirror 102). The entrance mirror 102 is highly reflective of the fundamental laser light and harmonics thereof. Therefore, backward-propagating fundamental laser light emitted from the laser gain chip 110, and any other backward-propagating fundamental or harmonic laser light in the laser cavity 101, is reflected by the entrance mirror 102 into the laser gain chip 110.

Forward-propagating fundamental laser light traverses a harmonic reflector 112 and first phase compensator, such as a first dispersive element 114, and enters a frequency multiplier chip which multiplies the frequency of the fundamental laser light to produce harmonic laser light. The harmonic reflector 112 is highly reflective of the harmonic laser light. Preferably, the frequency multiplier chip is a frequency doubler chip 116 formed of potassium titanyl phosphate (KTP) which doubles the frequency of the fundamental laser light to produce second harmonic laser light.

Forward-propagating harmonic laser light passes through second phase compensator, shown as a second dispersive element 118 and impinges on the mirrored surface 106. The mirrored surface 106 is preferably high reflective of fundamental laser light and partially transmissive of the harmonic laser light such that a portion thereof is reflected back into the laser cavity 101. The harmonic laser light which passes through the mirrored surface 106 forms the output beam of the laser 100. Maintaining a portion of the harmonic laser light within the laser cavity 101 increases the nonlinear coupling between the fundamental and harmonic laser light beams within the doubling crystal. Thus, resonating a portion of the harmonic laser light within the laser cavity 101 could increase the efficiency and output power of the laser 100 if the forward-propagating harmonic laser light constructively interfere in the cavity 101.

First and second dispersive elements 114 and 118 shift the phase of harmonic laser light which passes through the elements 114 and 118. To ensure efficient operation of the laser 100, substantially all of the forward-propagating harmonic laser light, whether generated in the forward direction or reflected into the forward direction, in the laser cavity 101 should be in-phase. Out-of-phase harmonic laser light beams have the potential to destructively interfere with each other and thereby reduce the output of the laser 100. First and second dispersive elements 114 and 118, which are preferably made of glass, vary the phase of the harmonic laser light beams within the laser cavity 101 such that the harmonic laser light beams constructively interfere with one another.

Figure 1A:
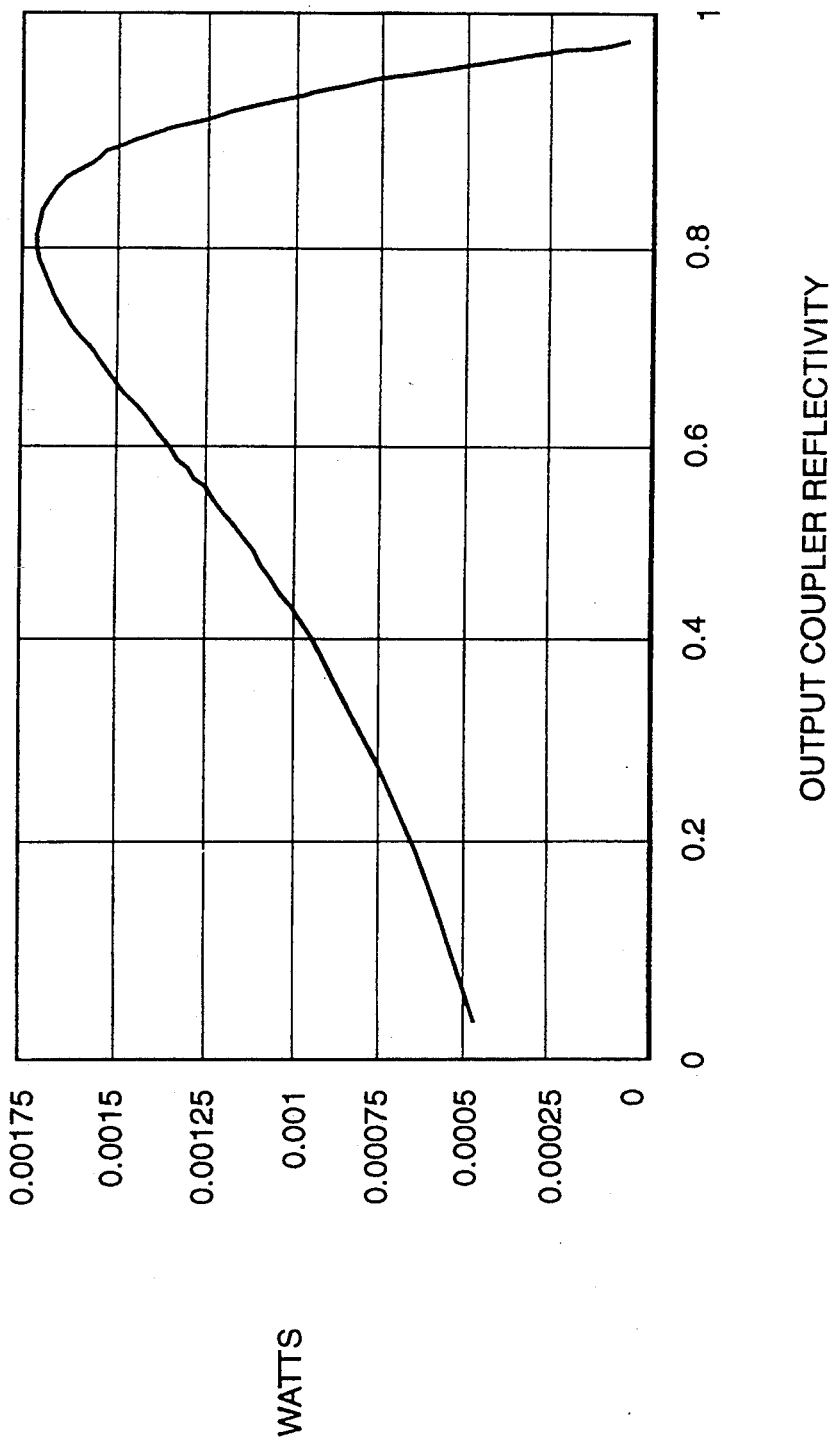
FIG. 1A is a graph of the output power of the laser of FIG. 1 for changing values of second harmonic reflectivity of a mirrored surface of an output coupler in the solid-state laser shown in FIG. 1.

For any given value of reflectivity of the harmonic reflector 112, there is a value of reflectivity to the harmonic laser light for the mirrored surface 106 of the output coupler 104 which maximizes the output power of the laser 100. For any given value of reflectivity of the harmonic reflector 112, there is a value of reflectivity for the harmonic laser light at the mirrored surface 106 of the output coupler 104 which maximizes the output poser of the laser 100. Increasing this reflectivity toward the optimum value feeds more harmonic light back through the doubling crystal, thereby increasing the nonlinear coupling between the fundamental and second-harmonic light within the doubler. Increasing the reflectivity beyond this optimum, however, confines a greater amount of the harmonic light within the cavity, thereby reducing the power exiting from the laser. The harmonic output may be further enhanced by increasing the reflectivity of the harmonic reflector 112; however the range of temperature over which a specified percentage of the maximum harmonic output is produced will be correspondingly narrowed. An exemplary graphical representation of the interrelationship between the maximum output power of the laser 100 and the reflectivity of the mirrored surface 106 of the output coupler 104 with the harmonic reflector having a reflectivity of 0.93 is shown in FIG. 1A. As is apparent, the maximum output power is approximately 0.00175 W with a mirrored surface 106 of generally 0.81 reflectivity.

Figure 2:
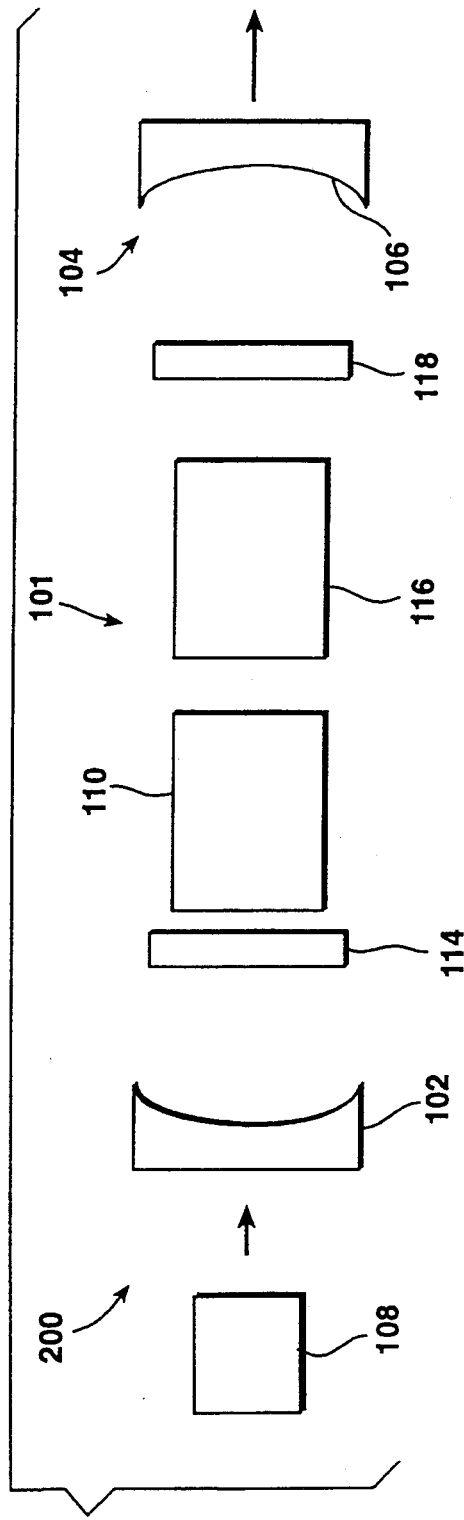
FIG. 2 is a bench construction of a solid-state laser in accordance with another embodiment of the present invention.

FIG. 2 is a bench construction of a frequency-doubled solid-state laser 200 in accordance with a second embodiment of the present invention. For clarity and ease of description, elements common to FIGS. 1 and 2 have the same reference numerals. The laser pump device 108 generates pump radiation which enters the laser cavity 101 through the entrance mirror 102 which forms the back end of the cavity 101. Output coupler 104 including the mirrored surface 106 forms the front end of the cavity 101.

The pump radiation passes through the entrance mirror 102 and first phase compensator, such as a first dispersive element 114, and enters the laser gain chip 110. In response to the pump radiation, the laser gain chip 110 lases to produce fundamental laser light. As noted previously, the fundamental laser light emanates from the laser gain chip 110 in both the forward and backward directions. The backward-propagating fundamental laser light passes through the first dispersive element 114 and is reflected by the entrance mirror 102 in the forward direction. Forward-propagating fundamental laser light enters the frequency doubler chip 116 wherein its frequency is doubled to produce harmonic laser light. Any fundamental laser light which passes through the frequency doubler chip 116 is reflected back into the frequency doubler chip 116 by the mirrored surface 106. The forward-propagating harmonic laser light passes through a second phase compensator, such as a second dispersive element 118, and a portion of the harmonic laser light passes through the mirrored surface 106 to form the output laser beam of the laser 200.

The backward-propagating harmonic laser light passes through the laser gain chip 110, the first dispersive element 114 and is reflected in the forward direction by the entrance mirror 102. Since the harmonic laser light passes through the laser gain chip 110, the laser gain chip 110 should be generally transparent to second harmonic laser light to reduce losses in the laser cavity 101. A laser gain chip 110 comprised of neodymium-doped gadolinium vanadate is preferred due to its high transparency to second harmonic laser light. A complete description of the use of gadolinium vanadate as a laser gain chip is provided in U.S. patent application Ser. No. 252,947, entitled "GADALINIUM VANADATE LASER", by Lussier et al., concurrently filed herewith, the disclosure of which is hereby incorporated by reference.

First and second dispersive elements 114 and 118, as noted above with respect to FIG. 1, control the phase of the harmonic laser light resonating in the laser cavity 101 such that substantially all of the forward-propagating harmonic laser light is in-phase at the mirrored surface 106. Preferably, first and second dispersive elements 114 and 118 are wedge shaped so that displacement of the dispersive elements 114 and 118 in a direction substantially perpendicular to the path of the laser light in the laser cavity 101 varies the effective width of the elements 114 and 118.

Figure 3:
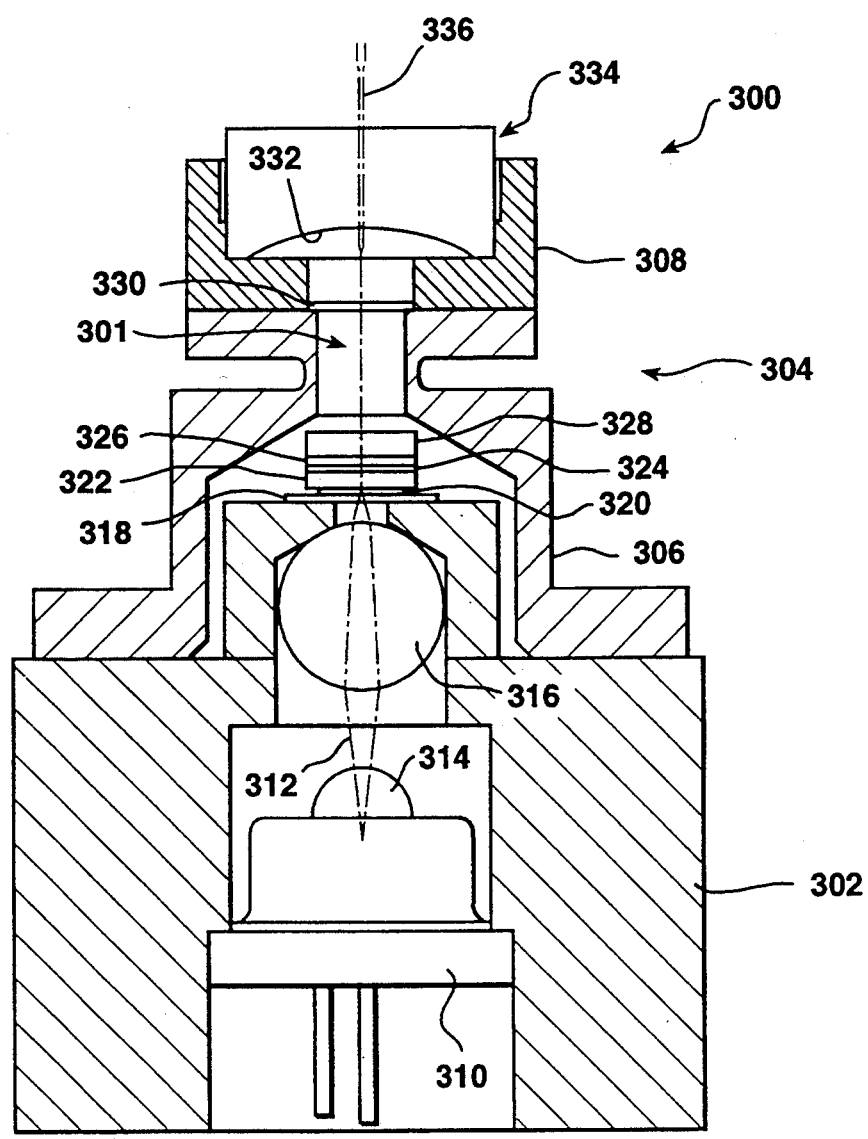
FIG. 3 is a full cross sectioned view of a commercial embodiment of the solid state laser of the present invention.

A commercial embodiment of a laser 300 having a laser cavity 301 in accordance with the present invention is shown in FIG. 3. The laser 300 includes a pump diode body 302 and a laser body assembly 304 comprised of a laser cavity body 306 and an output coupler body 308. Preferably, the pump diode body 302 and the laser cavity body 306 are made of dissimilar materials having different coefficients of expansion such that the length of the laser cavity 301 remains substantially constant or changes at a controlled rate during temperature fluctuations. Further, the output coupler body 308 may be fabricated from a third material to provide additional compensation for temperature fluctuations. A detailed description of the construction of the laser 300 may be found in U.S. patent application Ser. No. 08/253,072, entitled "Solid-State Laser", concurrently filed herewith.

A laser diode 310 generates pump radiation 312 which is focused by a plano-convex lens 314 and a ball lens 316 into the laser cavity 301. The pump radiation 312 traverses, in order, a mounting glass 318 which may be comprised of drawn glass microsheet and an entrance mirror 320. The pump radiation 312 enters a laser gain chip 322 which generates fundamental laser light in response thereto. The fundamental laser light passes through a harmonic reflector 324 and first phase compensator, such as a first dispersive element 326, and enters a frequency multiplier chip, such as a frequency doubler chip 328. The frequency doubler chip 328 doubles the frequency of the fundamental laser light to produce harmonic laser light.

The harmonic laser light passes through second phase compensator, such as a second dispersive element 330 and impinges upon a mirrored surface 332 of output coupler 334. A portion of the harmonic laser light is reflected back into the laser cavity 301 and the remaining harmonic laser light passes through the output coupler 334 to form the output beam 336 of the laser 300. The commercial embodiment shown in FIG. 3 operates similarly to the bench construction of FIG. 1 and, therefore, further discussion of the operation of laser 300 will not be provided herein.

As those skilled in the art will readily comprehend, the commercial embodiment of FIG. 3 can be easily modified to operate in accordance with the bench construction shown in FIG. 2 by interposing the first dispersive element 326 between the entrance mirror 320 and the laser gain chip 322 and removing the harmonic reflector 324. In such a construction, the entrance mirror 320 is highly reflective of harmonic laser light. Accordingly, such a laser should be considered to be within the scope of the invention.

Having thus described the invention in detail by way of reference to preferred embodiments thereof, it will be apparent that other modifications and variations are possible without departing from the scope of the invention defined in the appended claims.

What is claimed is:

1. A linear solid-state laser comprising:
   a laser cavity assembly for defining a laser cavity and including a mirrored surface forming a front end of said laser cavity;
   a laser pump device for generating pump radiation, said laser pump device positioned such that said pump radiation enters said laser cavity;
   a laser gain chip positioned in said laser cavity for generating fundamental laser light in response to said pump radiation;
   frequency multiplier chip for multiplying the frequency of said fundamental laser light to produce harmonic laser light;
   a harmonic reflector interposed between said laser gain chip and said frequency multiplier chip for reflecting said harmonic laser light into said frequency multiplier chip;
   a first phase compensator interposed between said harmonic reflector and said frequency multiplier chip for controlling the phase of said harmonic laser light which passes therethrough; and
   a second phase compensator interposed between said frequency multiplier chip and said front end of said laser cavity for controlling the phase of said harmonic laser light which passes therethrough, said first and second compensators shifting the phase of said harmonic laser light such that substantially all of said harmonic laser light is in-phase when said harmonic laser light arrives at said front end of said laser cavity.

2. The laser as recited in claim 1 wherein said mirrored surface forming said front end of said laser cavity is highly reflective of said fundamental laser light, partially reflective of said harmonic laser light and partially transmissive of said harmonic laser light.

3. The laser as recited in claim 1 wherein said laser gain chip is a neodymium-doped material.

4. The laser as recited in claim 1 wherein said frequency multiplier chip is a frequency doubler chip for doubling the frequency of said fundamental laser light to produce said harmonic laser light.

5. The laser as recited in claim 4 wherein said frequency doubler chip is formed of potassium titanyl phosphate.

6. The laser as recited in claim 1 wherein said first phase compensator comprises a first dispersive element.

7. The laser as recited in claim 6 wherein said first dispersive element has a wedge shape such that displacement of said first dispersive element varies the phase shift of said harmonic laser light which passes through said first dispersive element.

8. The laser as recited in claim 6 wherein said first dispersive element is glass.

9. The laser as recited in claim 8 wherein said harmonic reflector comprises a reflective coating applied to said first dispersive element for reflecting said harmonic laser light.

10. The laser as recited in claim 9 wherein said reflective coating is positioned immediately adjacent said laser gain chip.

11. The laser as recited in claim 10 wherein said second phase compensator comprises a second dispersive element.

12. The laser as recited in claim 11 wherein said second dispersive element has a wedge shape such that displacement of said second dispersive element varies the phase shift of said harmonic laser light which passes through said second dispersive element.

13. The laser as recited in claim 11 wherein said second dispersive element is glass.

14. A linear solid-state laser comprising:
an entrance mirror forming a back end of a laser cavity;
an output coupler including a mirrored surface forming a front end of said laser cavity;
a laser pump assembly for generating pump radiation and for transmitting said pump radiation into said laser cavity;
a laser gain chip positioned in said laser cavity for generating fundamental laser light in response to said pump radiation, said laser gain chip being generally partially transmissive to second harmonic laser light produced from said fundamental laser light;
frequency doubler chip for doubling the frequency of said fundamental laser light to produce said second harmonic laser light;
a first phase compensator interposed between said laser gain chip and said entrance mirror for controlling the phase of said second harmonic laser light which passes therethrough; and
a second phase compensator interposed between said frequency doubler chip and said mirrored surface of said output coupler for controlling the phase of said second harmonic laser light which passes through said second phase compensator, said first and second phase compensators shifting the phase of said second harmonic laser light such that substantially all of said second harmonic laser light is in-phase when said second harmonic laser light arrives at said mirrored surface of said output coupler.

15. The laser as recited in claim 14 wherein said laser gain chip is a neodymium stoichiometric material.

16. The laser as recited in claim 14 wherein said first phase compensator comprises a first dispersive element.

17. The laser as recited in claim 16 wherein said first dispersive element is glass.

18. The laser as recited in claim 16 wherein said entrance mirror comprises a reflective coating applied to said first dispersive element.

19. The laser as recited in claim 14 wherein said second phase compensator is a second dispersive element.

20. The laser as recited in claim 19 wherein said second dispersive element is glass.

21. The laser as recited in claim 14 wherein said mirrored surface forming said front end of said laser cavity is highly reflective of said fundamental laser light, partially reflective of said harmonic laser light and partially transmissive of said harmonic laser light.

22. A linear solid-state laser for generating harmonic laser light, said laser comprising:
a laser cavity assembly for defining a laser cavity and including an output coupler forming a front end of said laser cavity, said output coupler having a mirrored surface which is highly transmissive to said harmonic laser light;
a laser pump device for generating pump radiation and for transmitting said pump radiation into said laser cavity;
a laser gain chip positioned in said laser cavity for generating fundamental laser light in response to said pump radiation;
frequency multiplier chip for multiplying the frequency of said fundamental laser light to produce said harmonic laser light;
a harmonic reflector interposed between said laser gain chip and said frequency multiplier chip for reflecting said harmonic laser light into said frequency multiplier chip; and
a phase compensator interposed between said harmonic reflector and said frequency multiplier chip for controlling the phase of said harmonic laser light which passes through said phase compensator such that substantially all of said harmonic laser light is in-phase when said harmonic laser light arrives at said mirrored surface of said output coupler.

23. The laser as recited in claim 22 wherein said phase compensator is a dispersive element.

24. The laser as recited in claim 23 wherein said dispersive element is glass.

25. The laser as recited in claim 24 wherein said harmonic reflector is a reflective coating applied to a surface of said glass.

* * * * *